Figure 1:
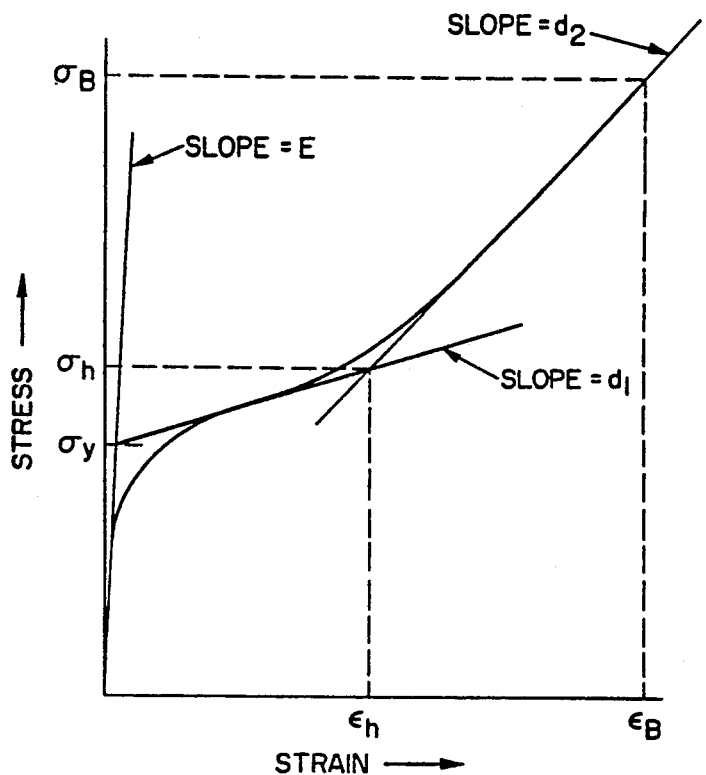

United States Patent [19]

Effenberger et al.

[11] Patent Number: 5,194,335
[45] Date of Patent: * Mar. 16, 1993

[54] FLUOROPOLYMER COATING AND CASTING COMPOSITIONS AND FILMS DERIVED THEREFROM

[75] Inventors: John A. Effenberger, Bedford; Frank M. Keese, Amherst, both of N.H.

[73] Assignee: Chemical Fabrics Corporation, Merrimack, N.H.

[*] Notice: The portion of the term of this patent subsequent to Nov. 26, 2002 has been disclaimed.

[21] Appl. No.: 801,779

[22] Filed: Nov. 26, 1985

Related U.S. Application Data

[63] Continuation-in-part of Ser. No. 599,764, Apr. 13, 1984, Pat. No. 4,555,543.

[51] Int. Cl.$^5$ ............................................. B32B 27/00
[52] U.S. Cl. ......................................... 428/421; 428/422; 524/520; 525/199; 525/200
[58] Field of Search ............... 524/520; 428/422, 421; 525/199, 200

[56] References Cited

U.S. PATENT DOCUMENTS

| | | |
|---|---|---|
| 2,681,324 | 6/1954 | Hochberg . |
| 2,710,266 | 6/1955 | Hochberg . |
| 3,019,206 | 1/1962 | Robb ................................. 260/29.6 |
| 3,051,683 | 8/1962 | Mallouk . |
| 3,075,939 | 1/1963 | Bauer, Jr. et al. ................... 524/520 |
| 3,484,503 | 12/1969 | Magner et al. . |
| 3,765,932 | 10/1973 | Kokubo et al. . |
| 3,904,575 | 9/1975 | Satokawa et al. . |
| 4,036,802 | 7/1977 | Poirier . |
| 4,039,713 | 8/1977 | Vassiliou . |
| 4,128,693 | 12/1978 | Dhami et al. . |
| 4,165,404 | 8/1979 | Quehl . |
| 4,252,859 | 2/1981 | Concannon et al. . |
| 4,555,543 | 11/1985 | Effenberger et al. ............... 525/199 |

FOREIGN PATENT DOCUMENTS

| | | |
|---|---|---|
| 0058393 | 8/1982 | European Pat. Off. . |
| 53-34848 | 3/1978 | Japan . |
| 997096 | 6/1965 | United Kingdom ................ 524/520 |

Primary Examiner—Joseph L. Schofer
Assistant Examiner—N. Sarofim

[57] ABSTRACT

A fluoroplastic resin dispersion is modified by the addition of a fluoroelastomer latex to yield a fluid coating or casting composition for forming films. The fluoroplastic resin dispersion, preferably an aqueous dispersion of a perfluoroplastic, such as polytetrafluoroethylene (PTFE), is modified by blending with a fluoroelastomer composition, preferably a latex, such that the fluoroplastic comprises up to about 95%, preferably up to about 90%, by weight of the invention composition. The fluoroelastomer component comprises at least about 5% by weight of the blend. The fluid composition and film according to the invention may preferably comprise from about 10-95% by weight fluoroplastic and from about 5-90% fluoroelastomer.

23 Claims, 1 Drawing Sheet

FLUOROPOLYMER COATING AND CASTING COMPOSITIONS AND FILMS DERIVED THEREFROM

This application is a continuation-in-part of U.S. application Ser. No. 06/599,764, filed Apr. 13, 1984, issued Nov. 26, 1985 as U.S. Pat. No. 4,555,543.

BACKGROUND OF THE INVENTION

This invention relates to fluoropolymer coating and casting compositions and films which may be derived from such compositions.

It is well known that perfluoroplastic coatings resulting from the simple deposition of an aqueous dispersion on a surface will tend to develop cracks while undergoing consolidation during drying or fusing operations if their thickness exceeds a certain maximum value, commonly referred to as the "critical cracking thickness". In the case of polytetrafluoroethylene, this thickness is generally expected to be on the order of 0.001 inches, for coating applied to smooth horizontal surfaces under ideal conditions. For fluorinated ethylenepropylene (FEP) or perfluoroalkoxy modified polytetrafluoroethylene (PFA) the value is less than 0.0005 inches. When such dispersions are applied to vertical surfaces, as is often desirable or necessary in the continuous coating of substrates in web form and in the dip or spray coating of objects, the effective critical cracking thickness is substantially reduced, often to less than half of the ideal value. In the case of relatively uneven or textured planar substrates, e.g. woven glass, it is difficult in practice to apply coatings of uniform thickness, since the coating fluids, under the influence of gravitional or capillary forces, tend to flow as they seek a position of minimum potential energy. This leads inevitably to a variation in the depth of such fluids and a resultant variation in the thickness of coalesced solids derived therefrom. Cracks can then develop when the thickness of deposited solids exceeds the critical value. In the case of three dimensional objects, surface tension and rapidly rising viscosity associated with coalescence often results in beading of the coating fluids along edges or corners of the object, resulting in thick resin deposits susceptible to cracking.

For certain purposes, such as in the coating of textiles, it is often necessary or desirable to apply uniform and continuous films of polytetrafluoroethylene or other fluoroplastics in thicknesses greater than the critical cracking thickness. A number of techniques for accomplishing this objective are well-known in the art.

Relatively thick crack-free coatings can be achieved through multiple, consecutive applications of coating fluid, each of which results in solid deposition less than the critical cracking thickness. Each application preferably involves drying and fusing of the solids between subsequent applications of the coating fluid. In the known production of coated textiles as by dip coating, this multiple coat build-up has shortcomings. The technique requires that the textile substrate to which the coating is applied be repeatedly subjected to the high temperatures required to melt fluoroplastics, i.e. above 650° F. in the case of polytetrafluoroethylene. Such repeated heating to such high temperature can result in degradation of the physical properties of the reinforcement and create mechanical stress concentrations in the coating matrix.

In the case of PTFE applied from relatively viscous fluid formulations, the problems associated with critical cracking thickness are dealt with by accepting the presence of cracks in an unfused or semi-fused condition, and subsequently attempting to heal them by calendaring at a temperature sufficient to soften the resin, but insufficient to melt it. The inability to uniformly deliver pressure to the resin thus consolidated due to the presence of hard and relatively stiff textile reinforcements reduces the effectiveness of this approach and some degree of microcracking remains even in the finished, fused products. This method is, moreover, limited to the coating of flexible, planar substrates and is not applicable to the coating of irregular surfaces or objects.

While mineral fillers may be employed to increase the nominal critical cracking thickness, their presence is often undesirable for reasons related to the end-use of products so manufactured.

U.S. Pat. No. 2,681,324 to Hochberg describes the addition of large quantities of aqueous dispersions of polymeric materials, such as alkyl acrylates and blends thereof, butyl methacrylate, styrene, styrene/butadiene copolymers, acrylonitrile, or butadiene/acrylonitrile copolymers, to polytetrafluoroethylene dispersions to form codispersions which can be used to apply relatively thick, crackfree poly tetrafluoroethylene coatings. These materials are thermally unstable at temperatures well below those required to fuse polytetrafluoroethylene and are for the most part fugitive in normal processes with attendant shrinkage of the coalescing film. U.S. Pat. No. 2,710,266, to Hochberg describes the addition of aqueous solutions of alkali metal silicates, for example sodium silicate, to polytetrafluoroethylene dispersions for the same purpose. While suitable for certain substrate, such compositions are largely unsuitable for the more commonly employed textile substrates, such as glass cloth.

accordingly, it is an object of this invention to provide a fluid fluoropolymer coating compositions which can be used to produce, with fewer applications of the fluid, relatively thick, crack-free coatings.

It is also an object of this invention to produce films, supported or unsupported, which are considerably thicker than those which can be readily produced from known formulations, and which may be formed as a planar sheet or a three-dimensional product, such as a glove, bladder, or other shape by dipping or spraying a removable mandrel.

It is a further object of the invention to provide fluoropolymer coating compositions which are process compatible with known fluoroplastics in that films formed therefrom can be thermally welded to them as well as to each other and to fluoroplastics, including perfluoroplastics.

It is also an object of this invention to provide fluid fluoropolymer coating compositions which may be useful for the improvement of fluoropolymer-containing articles by ameliorating undesirable behavior stemming from mudcracking and limited build rate inherent to known compositions and methods.

It is another object of this invention to provide fluoropolymer coatings, composites or film properties the mechanical behavior of which can be controlled through selective formulation of fluoroplastics and fluoroelastomers.

It is yet another object of this invention to provide fluoropolymer coatings or films with physical, chemical and electrical characteristics different from those obtainable with known fluoropolymers.

It is finally an object of this invention to provide a fluoropolymer coating composition able to bridge the relatively substantial discontinuities associated with many textile substrates.

SUMMARY OF THE INVENTION

In accordance with the invention, a fluoroplastic resin dispersion is modified by the addition of a fluoroelastomer latex to yield a fluid coating or casting composition. The fluoroplastic resin dispersion, preferably an aqueous dispersion of a perfluoroplastic, such as polytetrafluoroethylene (PTFE), is modified by blending with a fluoroelastomer composition, preferably a latex, such that the fluoroplastic comprises up to about 95%, preferably up to about 90%, by weight of the invention composition. The fluoroelastomer component comprises at least about 5% by weight of the blend. The fluid compositions according to the invention may preferably comprise from about 10–95% by weight fluoroplastic and from about 5–90% fluoroelastomer.

It should be understood that variations in the properties of the fluoroplastic and fluoroelastomer components may be made to accomplish a desired objective. For example, where a problem associated with the critical cracking thickness of a fluoroplastic resinous composition otherwise suitable, is to be overcome, the blend should comprise at least about 10% fluoroelastomer.

The term "fluoroplastic" as used herein to define the resin compositions to be modified encompasses both hydrogen-containing fluoroplastics and hydrogen free perfluoroplastics. Fluoroplastic means polymers of general paraffinic structure which have some or all of the hydrogen replaced by fluorine, including, inter alia, polytetrafluoroethylene (PTFE), fluorinated ethylene propylene (FEP) copolymer, perfluoroalkoxy (PFA) resin, modified fluoroalkoxy (TFA), homopolymers of chlorotrifluoroethylene and its copolymers with $VF_2$, such as KEL-F, or TFE, ethylenechlorotrifluoroethylene (ECTFE) copolymer and its modifications, ethylenetetrafluoroethylene (ETFE) copolymer and its modifications, polyvinylidene fluoride (PVDF), and polyvinylfluoride.

The term "fluoroelastomer" as used herein shall encompass both hydrogen-containing fluoroelastomers as well as hydrogen free perfluoroelastomers. Fluoroelastomer means any polymer exhibited elastomeric behavior or having a low flexural modulus, i.e. high compliance, and containing one or more fluorinated monomers having ethylenic unsaturation, such as vinylidene fluoride, and one or more comonomers containing ethylenic unsaturation. The fluorinated monomer may be a perfluorinated mono-olefin, for example hexafluoropropylene, tetrafluoroethylene, or perfluoroalkyl vinyl ethers, e.g. perfluoro (methyl vinyl ether) or (propyl vinyl ether) or modified fluoroalkoxyvinyl ether. The fluorinated monomer may also be a partially fluorinated mono-olefin for example vinylidene fluoride, pentafluoropropylene, chlorotrifluoroethylene, and which may contain other substituents, e.g. hydrogen, chlorine or perfluoroalkoxy. The mono-olefin is preferably a straight or branched chain compound having a terminal ethylenic double bond. The elastomer preferably consists of units derived from fluorine-containing monomers. Such other monomers include, for example, olefins having a terminal ethylenic double bond, especially ethylene and propylene. The elastomer will normally consist of carbon, hydrogen, oxygen and fluorine atoms. Any fluoropolymer component may contain a functional group such as carboxylic and sulfonic acid and salts thereof, halogen, as well as a reactive hydrogen on a side chain.

Preferred elastomers are copolymers of vinylidene fluoride and at least one other fluorinated monomer, especially one or more of hexafluoropropylene, pentafluoropropylene, tetrafluoroethylene and chlorotrifluoroethylene. Available fluoroelastomers include copolymers of vinylidene fluoride and hexafluoropropylene and tetrafluoroethylene, sold by DuPont as VITON and by 3M as FLUOREL and by Daiken as DAIEL. Additionally, elastomeric copolymers of vinylidene fluoride and chlorotrifluoroethylene are available from 3M as KEL-F. The use of AFLAS, which is a copolymer of TFE and propylene, as manufactured by Asahi, is also contemplated. A copolymer of TFE and partially fluorinated vinylethers is also a suitable elastomer.

Preferred perfluoroelastomers include elastomeric copolymers of tetrafluoroethylene with perfluoro alkyl comonomers, such as hexafluoropropylene or perfluoro (alkyl vinyl ether) comonomers represented by

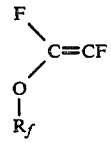

in which $R_f$ is a perfluoroalkyl or perfluoro (cyclo-oxa alkyl) moiety. Particularly preferred are the perfluorovinyl ethers in which $R_f$ is selected from the groups —$CF_3$, —$C_3F_7$,

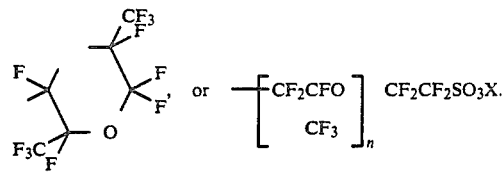

where n=1-4 and X=H, Na K or F. KALREZ, a copolymer of TFE and perfluoromethylvinyl ether (PMVE), or its modifications, is a particularly useful fluoroelastomer.

The fluoroelastomer polymer, preferably a latex or blend of latexes, should be compatible with (a) the fluoroplastic dispersion to be modified, (b) the processing conditions to which the composition must be subjected, and (c) the end use for which the material or articles containing it is being manufactured.

The invention also encompasses what is commonly termed "an unsupported film" comprising one or more resinous components derived from the fluid coating or casting compositions hereinbefore described. The film according to the invention may be formed by any suitable technique, and particularly by the methods described in pending application Ser. No. 599,766, filed Apr. 13, 1984 entitled "Fluoropolymer Composites and Novel Method for Making Them" which we incorporate herein by reference. A film according to the invention may be constructed as a sequence of lamellae the composition of which may be varied to induce the desired combination of electrical, magnetic, physical and chemical properties. If desired, a non-resinous component, such as a metallic, mineral or ceramic component, may be top coated upon or interspersed among the resinous lamellae; e.g., a thin metallic deposit to modify permeability, electrical, magnetic, or optical behavior of the film. Metallic, mineral or ceramic material may also be contained within a resinous lamellae. The utility of such deployment of the film lamellae to affect the mechanical and chemical behavior of composites derived from such films is described in our copending application Ser. No. 484,594, filed Apr. 13, 1983 and its C-I-P application filed Apr. 13, 1984, which we incorporate hereby by reference.

In an embodiment of the invention, the invention films may be supported by a member to which the film can be bonded to provide greater strength, dimensional stability or rigidity. For example, a film according to the invention may be supported by any suitable reinforcement material treated where necessary to facilitate bonding of the films thereto. Examples of suitable reinforcement materials include, inter alia, glass, fiberglass, ceramics, graphite (carbon), PBI (polybenzimidazole), PTFE, polyaramides, such a KEVLAR and NOMEX, metal, including metal wire, polyolefins such as TYVEX, polyesters such as REEMAY, polyamides, polyimides, thermoplastics such as KYNAR and TEFZEL, polyphenylene sulfide, polyether oxides, polyether sulfones, polyether ketones, and novoloid phenolic fibers such as KYNOL, cotton, asbestos and other natural as well as synthetic textiles. The substrate may comprise a yarn, filament, monofilament or other fibrous material either as such or assembled as a textile, or any woven, non-woven, knitted, matted, felted, etc. material.

Furthermore, the invention compositions are valuable in the manufacture of fluoropolymer coated textiles having a thick, crack-free coating matrix, without specific regard for the mechanical or other properties of the film or coating itself. For example, they may be used to reduce the number of operations required to apply a coating of a desired thickness. Such processing may result in composites which more efficiently utilize the inherent physical properties of a reinforcement than otherwise possible.

The following additives may be included in formulating the composition of the fluids and films according to the invention: a surface active agent such as an anionic active agent or non-ionic active agent; a creaming agent such as sodium or ammonium alginate; a viscosity-controlling agent or a thickener such a methyl cellulose or ethyl cellulose; a wetting agent such as a fluorinated alkylcarboxylic acid, an organic solvent, or sulfonic acid; or a film former.

In addition, relatively small amounts of cross-linking accelerators, such as triallyl isocyanurate, triallyl imidazole, and the like, may be used to cross-link one or more of the resins contained in the coating layers, as desired, by use of high energy electrons or actinic irradiation.

The invention and its advantages are illustrated, but are not intended to be limited by, the following examples. The examples illustrate coating compositions and films employing a variety of fluoroplastic and fluoroelastomer components contemplated by the invention. The test procedures used for the chemical and physical testing and property determinations for the composites prepared according to the invention and the controls are identified below:

| PROPERTY | TEST PROCEDURE |
|---|---|
| Weight (oz/sq yd) | FED STD 191-5041 |
| Thickness (ins) | FED STD 191-5030 |
| Tensile Strength (lbs/in) | ASTM D-412 |
| Coating Adhesion (lbs/in) | * |
| Dielectric Strength (volts) | ASTM D-902 |
| Film Elongation at break | ASTM D-412 |
| Tear Strength | ASTM D-624 (die C) |

*This test measures the adherence of the coating matrix to a substrate by subjecting a specimen (prepared from two pieces of the sample composite joined face to face as in making a production type joint or seam) to an Instron Tester, Model 1130, whereby the pieces forming the specimen are separated for a special length (3") at a specified rate of strain (2"/min.). The average reading during separation is deemed the adhesion value in lbs./in.

EXAMPLE 1

A modified PTFE dispersion containing 60 percent by weight of PTFE and 40 percent by weight of a vinylidine fluoride/hexafluoropropylene/tetrafluoroethylene terpolymer fluoroelastomer was prepared by combining 100 parts by weight of TE-3313 (PTFE dispersion containing 60 percent by weight PTFE) and 64 parts by weight of VTR-5307 (fluoroelastomer latex containing 62.5 percent by weight fluoroelastomer). Both ingredients were purchased from E. I. DuPont de Nemours and Company, Inc., Wilmington, Del. (DuPont). The resulting mixture has a specific gravity of approximately 1.45 and a viscosity of 40 centipoise, measured at 70° F., using a Brookfield Model LVF viscometer with No. 2 spindle at 60 RPM. Two methods were employed to investigate the coating or casting qualities of this composition, as follows:

Method A

In Method A, a film of variable thickness was cast on a horizontal aluminum foil substrate, air dried, and baked. The film thus provided was examined at 30X magnification for the presence of cracks. The fluid formulation was applied using a Gardner Film Casting Knife, 6 inches wide (available from Pacific Scientific, Gardner Laboratory Division, Bethesda, Md.) with the blade set at an angle so that clearance was close to zero at one end and between 0.020 to 0.035 inches at the other. The aluminum foil support was 0.0032 inches thick and was held in a horizontal plane. A quantity of the modified dispersion was filtered through paper (code no. 01-4103-05, Schwartz Manufacturing Co., Two Rivers, Wis.), vacuum de-aired for approximately 5 minutes, and poured along one edge of the supporting foil. The film was made by slowly hand drawing the composition with a knife. The film was allowed to air dry. When dry, the supported film was placed in an air circulating oven at approximately 500° F. The oven temperature was increased to 720° F. over a period of 15 minutes, whereupon the specimen was removed to room temperature and allowed to cool.

The film thus produced varied in thickness from approximately 0.003 to 0.010 inches. There were no cracks whatsoever in that portion of the film which measured less than 0.005 to 0.006 inches. While isolated and occasional shrinkage cracks were observed in that portion of the film thicker than 0.006 inches, no overall mud cracking was observed even in the thickest portions of the film.

Method B

In Method B, the invention composition was cast in a film of variable thickness on a variable substrate, and subsequently dried and baked. A foil substrate was drawn through a bath of the invention composition at rates varying between 6 and 24 inches per minute to produce a film of continuously increasing thickness. The film was dried in air at 200° to 240° F. and baked for 2 minutes at 650° to 750° F.

The thickness of the film thus produced was measured and found to be approximately 0.0015 inches at its maximum. The film was a uniform cream color and was smooth an unbroken, exhibiting no mudcracking or isolated cracks whatsoever.

EXAMPLE 2

An unmodified TE-3313 PTFE dispersion was evaluated by Methods A and B described in Example 1, with results shown in Table A below.

EXAMPLES 3-10

A number of additional compositions were prepared and evaluated and described in Example 1, as shown in the following Table A.

EXAMPLE 11

A sample of CHEMFAB TCGF 100-10, PTFE coated glass fabric nominally 0.010 in. thick and 14 to 15 oz/yd weight, was obtained and weight, dielectric breakdown, and coating adhesion were measured. A coating of a modified PTFE dispersion prepared according to Example 1 was applied to this sample by dipping, drying, and fusing in a vertical coating tower by a single application. Weight, dielectric strength, and coating adhesion were measured on the coated sample. The results are shown below.

| Property | Units | 100-10 | Example 11 |
|---|---|---|---|
| Weight | oz/yd | 14.9 | 16.2 |
| Dielectric ¼ in. elec. | volts | 7400 | 9000 |
| Breakdown 2 in. elec. | | 5500 | 8500 |
| Coating adhesion | lbs/in. | 8.0 | 8.9 |

The above example illustrates the property of the invention composition to improve the integrity and uniformity or PTFE coatings. The measured increase in dielectric breakdown strength, especially as measured with the 2 inch diameter electrode, is significant. The coating adhesion of the treated composite is greater than that of the original product indicating that the coating derived from the invention composition can be strongly bonded to a PTFE surface.

EXAMPLE 12

Invention compositions were prepared by blending Teflon 30B and VTR-5307 (VF$_2$/HFP/TFE elastomeric copolymer obtained from DuPont) as follows:

TABLE A

| EXAMPLE NO. | | 1 | 2 | 3 | 4 | 5 | 6 | 7 | 8 | 9 | 10 |
|---|---|---|---|---|---|---|---|---|---|---|---|
| fluoroplastic dispersion | TE-3313 | 100 | 100 | — | — | 100 | 100 | 42. | 100 | 100 | 100 |
| (parts by weight) | Teflon 30B[1] | — | — | 100 | — | — | — | — | — | — | — |
| | TE-9503[2] | — | — | — | 100 | — | — | 45 | — | — | — |
| fluoroelastomer | VTR-5307 | 64 | — | 64 | 55 | 11 | 32 | 80 | — | — | — |
| latex (parts by weight) | L-6517[3] | — | — | — | — | — | — | — | 73 | — | — |
| | L-9025[4] | — | — | — | — | — | — | — | — | 61 | — |
| | AFLAX (latex)[5] | — | — | — | — | — | — | — | — | — | 129 |
| fluoroplastic/fluoroelastomer (wt. %) | | 60/40 | 100/0 | 60/40 | 60/40 | 90/10 | 75/25 | (25,25)/50 | 60/40 | 60/40 | 60/40 |
| maximum thickness of crack-free film formed per method A (mils) | | >6.0 | 0.6 | 4.0 | 0.8 | — | >1.2 | 1.1 | >6.0 | >3.5 | >1.2 |
| maximum thickness of crack-free film formed per method B (mils) | | >1.5 | 0.3 | — | 0.5 | >1.0 | >1.0 | — | — | >1.5 | — |

[1] A PTFE dispersion, approximately 60 percent solids, purchased from DuPont.
[2] An FEP (fluorinated ethylene propylene) dispersion, approximately 55 percent solids, purchased from Du Pont.
[3] A vinylidine-fluoride/hexafluoropropylene copolymer elastomer in latex form, approximately 55 percent solids.
[4] L-9025 is a vinylidene fluoride/hexafluoropropylene/tetrafluoroethylene terpolymer elastomer in latex form, approximately 66 percent solids.
[5] A tetrafluoroethylene/propylene copolymer fluoroelastomer latex, approximately 31 percent solids.

| Example 12 | A | B | C | D | E |
|---|---|---|---|---|---|
| Teflon 30B (pbw) | 66 | 83 | 99 | 111 | 116 |
| VTR-5307 (pbw) | 97 | 81 | 65 | 53 | 48 |

Films derived from these compositions were produced by casting on a carrier, drying and baking at 700° F. Test performed on the materials and the results obtained are presented in Table B below. The modulus and draw values were obtained from the tensile stress/strain curves as shown in FIG. 1.

TABLE B

| TABLE A - PROPERTIES OF PTFE/FLUOROELASTOMER CAST FILMS | | | | | | | |
|---|---|---|---|---|---|---|---|
| Property | Units | Test Method | EX. 12A | EX. 12B | EX. 12C | EX. 12D | EX. 12E |
| PTFE content | wt % | — | 40 | 50 | 60 | 67 | 70 |
| Elas. content | wt % | — | 60 | 50 | 40 | 33 | 30 |
| Tensile Strength ($\sigma_B$) | psi | ASTM D-412 | 1480 | 1860 | 2450 | 2530 | 3260 |
| Elongation at Break ($\epsilon_B$) | % | ASTM D-412 | 470 | 500 | 480 | 445 | 425 |
| Tear Strength | lbs/in. | ASTM D-624 (die C) | 150 | 160 | 200 | 225 | 260 |
| Dielectric Strength | volts/mil, avg. | ASTM D-902 (¼ in elec.) | 1200 | 1200 | 1200 | 1200 | 1200 |
| Initial Tensile Modulus (E) | $10^3$ psi | See FIG. 1 | 3.3 | 5.3 | 5.9 | 18.7 | 19.1 |
| Initial Draw Modulus ($d_1$) | $10^3$ psi | See FIG. 1 | .15 | .17 | .17 | .27 | .18 |
| Final Draw Modulus ($d_2$) | $10^3$ psi | See FIG. 1 | .27 | .35 | 1.03 | .54 | .62 |
| Yield Stress ($\sigma_y$) | psi | See FIG. 1 | 530 | 700 | 990 | 1040 | 1290 |
| Hardening Stress ($\sigma_h$) | psi | See FIG. 1 | 870 | 1030 | 1400 | 1740 | 2530 |

TABLE B-continued
TABLE A - PROPERTIES OF PTFE/FLUOROELASTOMER CAST FILMS

| Property | Units | Test Method | EX. 12A | EX. 12B | EX. 12C | EX. 12D | EX. 12E |
| --- | --- | --- | --- | --- | --- | --- | --- |
| Hardening Strain ($\epsilon_h$) | % | See FIG. 1 | 200 | 210 | 250 | 240 | 220 |

Strain rate: 20 in/min (1000%/min) Temp: 70° F.

Figure 2:
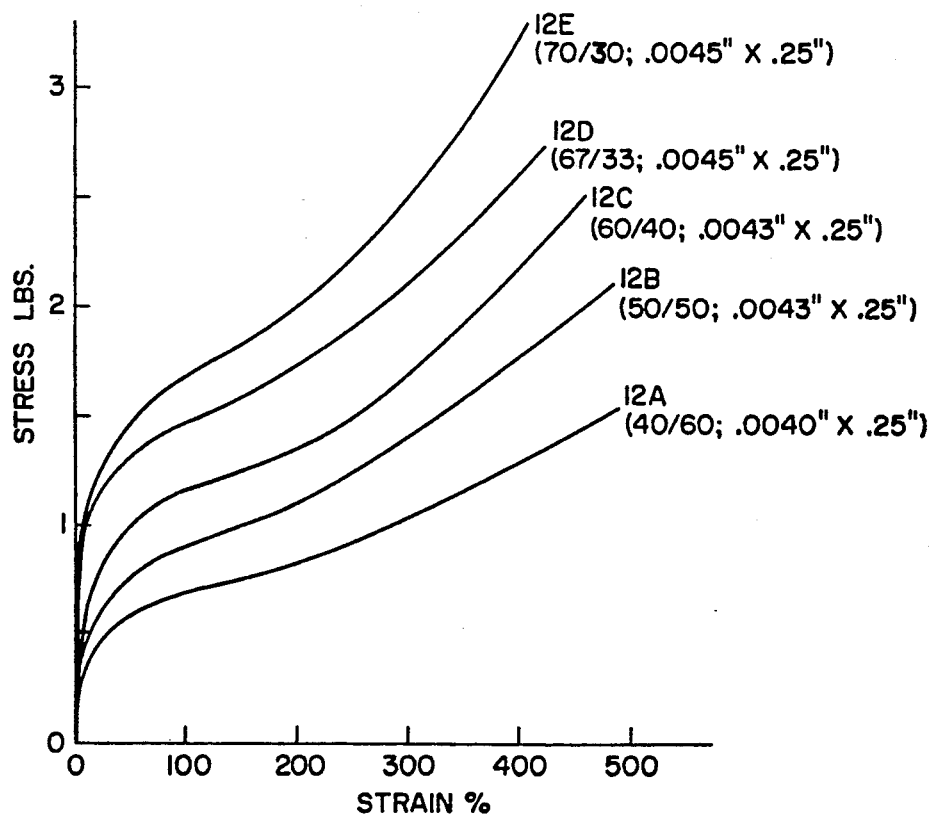

Representative tensile stress-strain curves for each configuration of Example 12 are shown in FIG. 2. The weight percent as well as the film thickness and width of each sample is indicated parenthetically in FIG. 2.

EXAMPLE 13

A laminated composite suitable for use in the manufacture of printed circuit boards was prepared from (a) silane treated copper foil, (b) cast films of flexible fluoropolymer, and (c) a fiberglass substrate prepared by lightly coating it with FEP.

The copper foil employed was 3 mils thick (Yates Industries, Bordentown, N.J.; Type "A" etch), one face of which was treated with a 1% aqueous solution (w/v) of A-1100 Silane (Union Carbide Corp.) and air dried in an oven at 225° F. The treated face contacted the fluoropolymer films in preparation of the laminated composite.

The fluoropolymer films employed were prepared by casting a blend of PTFE and VF$_2$/HFP/TFE elastomeric copolymer derived from aqueous latexes (TE-3313 and VTR5307 respectively, obtained from DuPont). The blend contained a 60:40 weight ratio of PTFE to fluoroelastomer. This blend was cast onto an aluminum foil substrate initially coated with a light FEP layer derived from TE-9503 (DuPont) diluted to a specific gravity of 1.30. Overall film thickness was about 1 mil after baking at 590° F. and stripping from the aluminum foil.

The fiberglass substrate was a style 128 fiberglass fabric dip coated with FEP derived from TE-9503 (55% solids) to a total weight of 8.4 oz./sq.yd. The fabric was heat cleaned prior to coating. A laminate was prepared from these material by alternately stacking the prepared fiberglass substrate and fluoropolymer containing film such that the top and bottom layers of the stack presented an FEP face to the copper foil deployed as the outermost components of the stack for lamination. Three layers of the fiberglass substrate were interleaved with four layers of film, and a foil layer was employed to create each outermost face. This stack was converted to a laminate by pressing for five minutes at 550° F. and ca. 500 psi and subsequently cooled under pressure. The resulting laminate was judged economically suitable for use as a printed circuit board intermediate.

EXAMPLES 14 A-C

Pieces of copper foil, 0.003 inches thick, etched on one side (available from Yates Industries, Inc., Bordentown, N.J.; specify type "A" etch) were washed with soap and water, rinsed with distilled water, washed with reagent grade acetone, and air dried. The etched surface was treated with gamma-Aminopropyltriethoxysilane (available from Union Carbide Corporation, New York, N.Y. as A-1100) by dipping in a 1% aqueous solution and drying in an air circulating oven at 225° F. Laminates were made on the treated foil substrate as shown in the following table:

|  | 25A | 25B | 25C |
| --- | --- | --- | --- |
| Initial coat layer | .005 "FEP Film* | TE-5489 Film* (from solids) | FMK-4-10-B Film* (from solids) |
| Overcoat | FMK-4-10-B film | no overcoat | no overcoat |
| Platen temperature (°F.) |  | 550 |  |
| Pressure on specimen (psi) |  | 130 |  |
| Time at temperature (min) |  | 5 |  |
| Laminate thickness (inches) | .0108 | .0062 | .0065 |

*Each film was processed above the fusing temperature of the respective resins.

FMK-4-10-B is a blend of 60% PTFE and 40% Viton B fluoroelastomer (VTR-5307 obtained from DuPont as a terpolymer latex, 60–65% solids).

TE-5489 is a low crystallinity perfluorinated TFE that, as supplied by DuPont, contains a high temperature methyl-phenyl silicone oil. When the dispersion is dried to form a crumb and the crumb is pressed into a film, the silicone oil saturates and coats the films and prevents adhesion to other components in hot pressed laminates. To remove this silicone, the cast film was chopped and washed in clean toluene in a Ross Mixer-Emulsifier, dried in an air circulated oven at 50° C., and re-pressed to a film. This was repeated four times and the resulting silicone-free film was used in making Example 14B.

The three examples are foils with durable, compressible polymeric coatings. Example 14B possessed a particularly soft yet resilient coating very firmly bonded to the copper surface. The coating can be gouged with a knife but shows no tendency to delaminate even in boiling water. Example 14C has a somewhat less resilient and softer coating than 14B, but appears equally resistant to delamination. Example 14A has coating characteristics similar to 14C, but was the most easily gouged of the three.

EXAMPLE 15 A

A thin extruded coating of PTFE was applied by paste extrusion to ECG 37 ⅓ fiberglass yarn. The jacketed yarn thus produced was woven into an approximately 14×15 count plain woven fabric weighing approximately 35 oz./yd.$^2$ (about 60% of which is represented PTFE). Overcoat layers were applied as follows: Cast films of FMK-4-10-B were laminated to both sides of this substrate in a platen press at a pressure of approximately 280 psi. Platen temperatures of 700° F. were maintained for 5 minutes, followed by cooling to approximately 150° F. Over a period of about 15 minutes, also under pressure. The resulting product weight 41 oz./yd. 2, had excellent physical integrity, and was exceptionally flexible.

EXAMPLE 15B

A cast film of a 60/40 weight % blend of TE-3313 and fluoroelastomer (derived from L-9205) latex (obtained from 3M) was laminated to the substrate of Example 15A. The resulting product has a flexibility and integrity comparable to Example 15A.

While representative applications and embodiments of the invention have been described, those skilled in the art will recognize that many variations and modifications of such embodiments may be made without departing from the spirit of the invention, and it is intended to claim all such variations and modifications as fall within the true scope of the invention.

We claim:

1. An unsupported film comprising one or more resinous components derived from a fluid coating or casting composition comprising a blend of fluoroplastic and a fluoroelastomer, wherein the fluoroplastic component comprises up to about 95% by weight of the composition, and wherein said blend has been coated or cast upon a support substrate and heated to a temperature sufficient to fuse the blend prior to separation from the said support substrate.

2. A film according to claim 1 which comprises a blend of about 10-95% by weight fluoroplastic and about 5-90% by weight fluoroelastomer.

3. A film according to claim 1 wherein the fluoroplastic comprises up to about 90% by weight of the blend.

4. A film according to claim 1 wherein the fluoroplastic is incorporated as an aqueous dispersion.

5. A film according to claim 1 wherein the fluoroplastic is a perfluoroplastic.

6. A film according to claim 5, wherein the perfluoroplastic is polytetrafluoroethylene, modified fluoroalkoxy resin, perfluoroalkoxy resin, or fluorinated ethylene propylene.

7. A film according to claim 5 wherein the fluoroelastomer is incorporated as a latex.

8. A film according to claim 7, wherein the fluoroelastomer is a copolymer of vinylidene fluoride and hexafluoropropylene, a terpolymer of vinylidene fluoride, hexafluoropropylene and tetrafluoroethylene, a copolymer of tetrafluoroethylene and propylene, a copolymer of tetrafluoroethylene and perfluoromethyl vinyl ether, a copolymer of tetrafluoroethylene and fluorinated vinyl ethers, or a copolymer of vinylidene fluoride and chlorotrifluoroethylene.

9. A film according to claim 1 comprising a sequence of lamellae wherein one or more comprise a fluoroplastic and fluoroelastomer blend.

10. A film according to claim 9 wherein at least one non-resinous component is top-coated upon or interspersed with other resinous lamellae.

11. A film according to claim 10 wherein the nonresinous lamellae comprises a metallic, mineral, or ceramic composition.

12. A film according to claim 9 wherein one or more of the lamellae contains a metallic, mineral, or ceramic composition.

13. A film according to claim 1 applied to a suitable reinforcement material.

14. A film according to claim 1 containing cross-linking accelerators.

15. A film according to claim 1, containing one or more additives selected from the group consisting of surface active agents, creaming agents, viscosity controlling agents, wetting agents and film formers.

16. An unsupported film comprising one or moore resinous components derived from a fluid coating or casting composition comprising a blend of a perfluoroplastic and a perfluoroelastomer, wherein the perfluoroplastic component comprises up to about 95% by weight of the composition, and wherein said blend has been coated or cast upon a support substrate and heated to a temperature sufficient to fuse the blend prior to separation from the said support substrate.

17. A film according to claim 16, wherein the composition comprises a blend of about 10-95% by weight perfluoroplastic and about 5-90% by weight perfluoroelastomer.

18. A film according to claim 16, wherein the perfluoroplastic comprises up to about 90% by weight of the blend.

19. A film according to claim 16, wherein the perfluoroplastic is in an aqueous dispersion.

20. A film according to claim 16, wherein the perfluoroplastic is polytetrafluoroethylene or fluorinated ethylene propylene.

21. A film according to claim 16, wherein the fluoroelastomer is in a latex.

22. A film according to claim 21, wherein the perfluoroelastomer is a copolymer of tetrafluoroethylene and hexafluoropropylene or perfluoromethylvinylether.

23. A film according to claim 1, wherein the blend has been heated to a temperature between 500° F. and 750° F.

* * * * *